Nov. 18, 1969 YOW-JIUN HU ET AL 3,478,658

OPTICAL FINGERPRINT RECORDING DEVICE

Filed Dec. 6, 1966 3 Sheets-Sheet 1

INVENTOR

You-Jiun Hu

George L. Buck

BY Jacob Frank

ATTORNEY

Nov. 18, 1969 YOW-JIUN HU ET AL 3,478,658

OPTICAL FINGERPRINT RECORDING DEVICE

Filed Dec. 6, 1966 3 Sheets-Sheet 2

Nov. 18, 1969 YOW-JIUN HU ET AL 3,478,658

OPTICAL FINGERPRINT RECORDING DEVICE

Filed Dec. 6, 1966 3 Sheets-Sheet 3

United States Patent Office 3,478,658
Patented Nov. 18, 1969

3,478,658

OPTICAL FINGERPRINT RECORDING DEVICE

Yow-Jiun Hu, Alexandria, and George L. Buc, Fairfax County, Va., assignors to Farrington Business Machines Corporation, Springfield, Va., a corporation of Massachusetts Filed Dec. 6, 1966, Ser. No. 599,533
Int. Cl. G03b 17/24
U.S. Cl. 95—1.1 15 Claims

ABSTRACT OF THE DISCLOSURE

Apparatus for photographically recording one or more fingers or skin areas is disclosed including a housing. A prism is disposed at the top of the housing having first, second and third plane faces. Disposed at the third plane face is either a light absorbing chamber or a light absorbing coating. A camera having at least the lens thereof disposed within the housing has its lens focused through the housing enclosure to the first face of the prism via the second face thereof, the finger or skin area being placed upon or contacting the first face. A light source has its rays directed through the second face to the first face and thence to the third face by means of total internal reflection where the rays are absorbed by the above-mentioned light absorbing medium. Thus, as long as no finger or skin area is contacting the first face of the prism the camera will see not light; however, as soon as such contact is established the total internal reflection will be interrupted at the points of contact thereby causing a certain amount of the light directed to the first face to be reflected back through the second face into the focusing lens of the camera. Hence, the ridges of a fingerprint would illuminate the camera film while the valleys thereof would appear as dark areas on the film.

The present invention relates to improvements in apparatus for photographically recording one or more fingers or skin areas to provide a positive record of a person for identification or medical purposes.

The art of recording fingerprints with an ink pad is well known, and in ordinary usage is accomplished by inking the skin surface which when pressed in contact with a document will transfer thereto those ridge outlines and not the valleys defining the relief of the skin surface. Through the years, the ink pad method of fingerprinting, mainly due to its simplicity, has become commonplace and is virtually the only technique used in recording fingerprints. Nevertheless, despite its exclusive use in dactylography, the ink pad method does have certain drawbacks such as: smudging caused by too much ink and/or imperfect rolling; distortion or dislocation of ridge characteristics resulting from excessive pressure used in the rolling process; lack of a clear demarcation between the ridge and valley due to uneven non-uniform spreading of ink with the application of a slightly varying pressure; and the untidy or grimy aspects involved in utilizing inks. Aside from the above, it would appear that hospitals are reluctant to employ ink for finger or palm printing of newborn babies. Further, in developing modern and effective fingerprint data storage and retrieval systems, the use of large bulky cards, of the type employed in the ink pad process, would not appear to be the most suitable medium for such systems. Also it would seem to be very difficult to utilize ink to record animal paw and nose prints (such as dogs) should such prints of this type be desirable for identification purposes.

In the field of recording fingerprints, palmprints, foot-prints and the like, the use of photography, such as that disclosed in U.S. Patent No. 2,195,699, issued Apr. 2, 1940 to Johnson, has been known for years, and has been carefully investigated by many due to the possible elimination of drawbacks of the ink pad technique such as those set forth above. However, photography has been infrequently used, as the commonplace ink pad method of fingerprinting additionally possesses a number of desirable advantages which have not yet been adequately achieved with photographic systems adapted for recording such prints. Certain significant advantages which are obtained from the ink pad method and which would be desired in most any fingerprint recording technique, are: excellent contrast of the recorded black ridge outlines appearing on the skin surface with the intermediate white areas defining the valleys between the ridges; the ability to carefully record multiple fingerprints one at a time on a single document; and the capability of additionally recording adjacent but opposite sides of the finger edge in a single print by rolling a finger or the like. Most all known photographic fingerprint recording techniques use or used systems similar to the Johnson patent in that light rays emitted from the light source were guided in a path so as to normally be directed through a transparent medium to the camera lens, by utilization of the old and well-known principle of total internal reflection. In pressing a finger against that area of the transparent medium where total internal reflection takes place, and then, for an instant, opening the camera lens to take a black on white picture, the skin ridges of the finger are recorded as the ridges appear relatively dark as compared with the light source, since the light is frustrated at the skin ridges which make contact with the transparent medium to be partially absorbed in the skin, but not at the valleys where reflection is still total. However, due to internal reflection of ambient light rays within the transparent medium the black to white contrast leaves much to be desired.

The general purpose of this invention is to provide an improved photographic system for readily recording one or more fingers or skin areas and the like, the system endowed with those desired characteristics common to the ink pad method, which heretofore were not present in photographic fingerprint recording systems. To achieve this, the present invention uses a light source, camera and transparent body, however, the manner in which this apparatus is utilized is significantly different than shown in the prior art as will become apparent to the reader. Specifically, the light source is employed to normally direct light rays not to the camera lens, but through a multi-faced transparent body onto a first face thereof, where total internal reflection takes place, the light rays then being reflected toward a second face of the transparent medium. Adjacent the second face is dark, light absorbing means for dissipating the reflected light rays and therefor not exposing the camera lens to the light rays. The camera lens is focused at an area on said first face and so positioned that when the lens is open it is adapted to normally see black due to the dark, light absorbent means present at the second face. Accordingly, only when a skin area is pressed into contact with the first face and illuminated will light rays, striking the ridge portions of the skin area, be partially reflected to appear at the camera lens to provide a relatively image white on the black background. It can be readily seen that the camera lens could be maintained in an open condition while a finger is rolled on the first surface thereby recording a rolled finger print. In a preferred embodiment of the present invention a prism like shaped object is used for the transparent body. Other features of the present invention provide for: simultaneous recording of printed identity information identifying the owner of the fingerprints to be recorded; permanent information engraved on the transparent medium which may be visually seen by the user of the apparatus and at the same time exposed to the camera lens for identifying that skin area(s) the fingerprints are taken from; and a method and apparatus for conveniently reproducing copies of the prints and information photographically recorded, and/or displaying the same for monitoring purposes.

Figure 1:
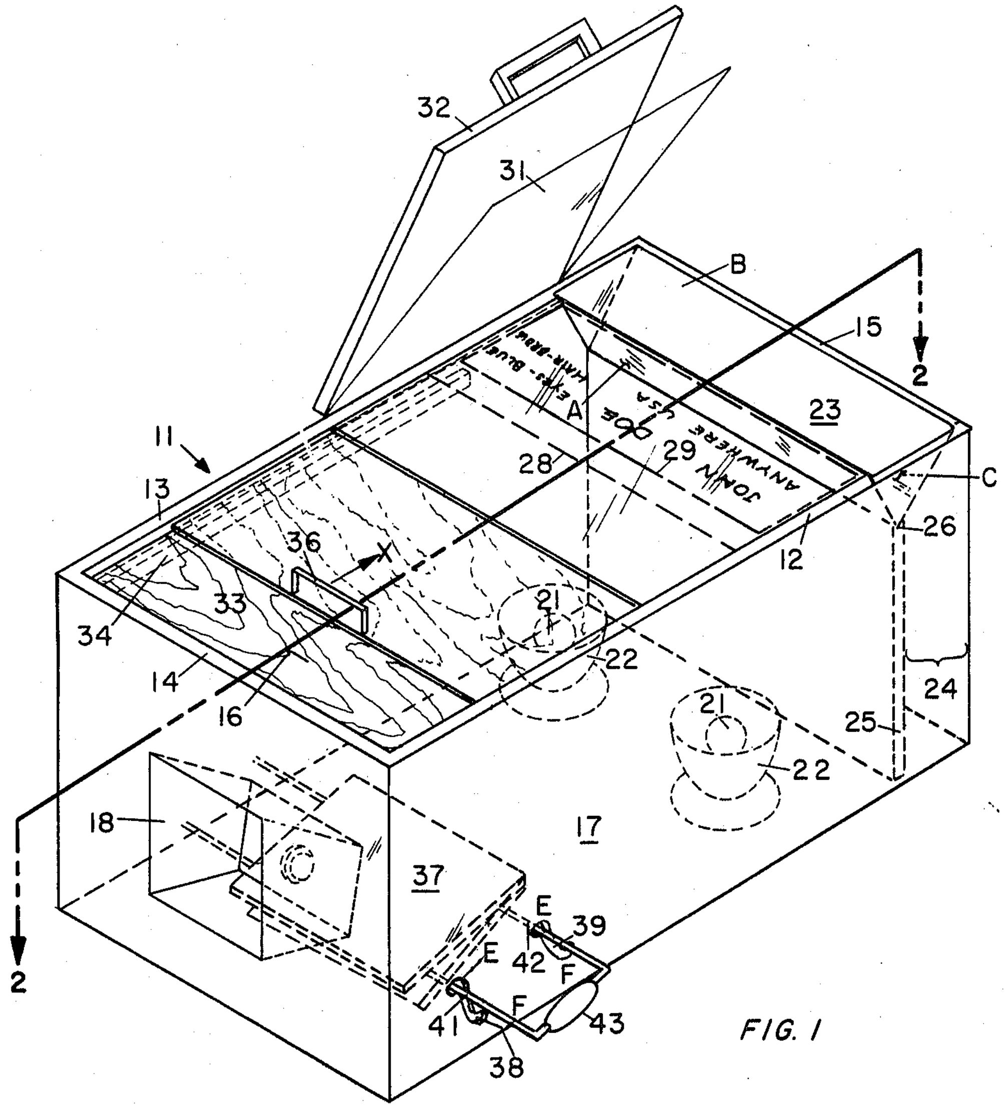
FIGURE 1 is a perspective view of a device for photographically recording finger, palm and/or foot prints in accordance with the present invention.
Figure 3:
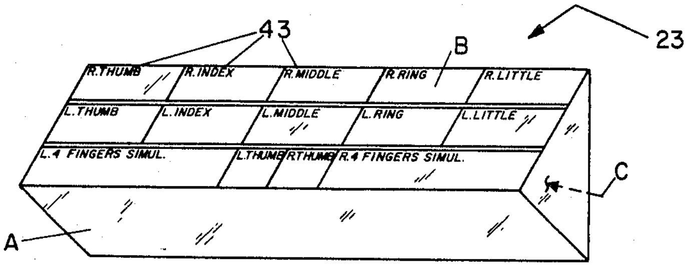
FIGURE 3 is a perspective view of an etched prism adapted for use with the recording device of the present invention.
Figures 2, 4:
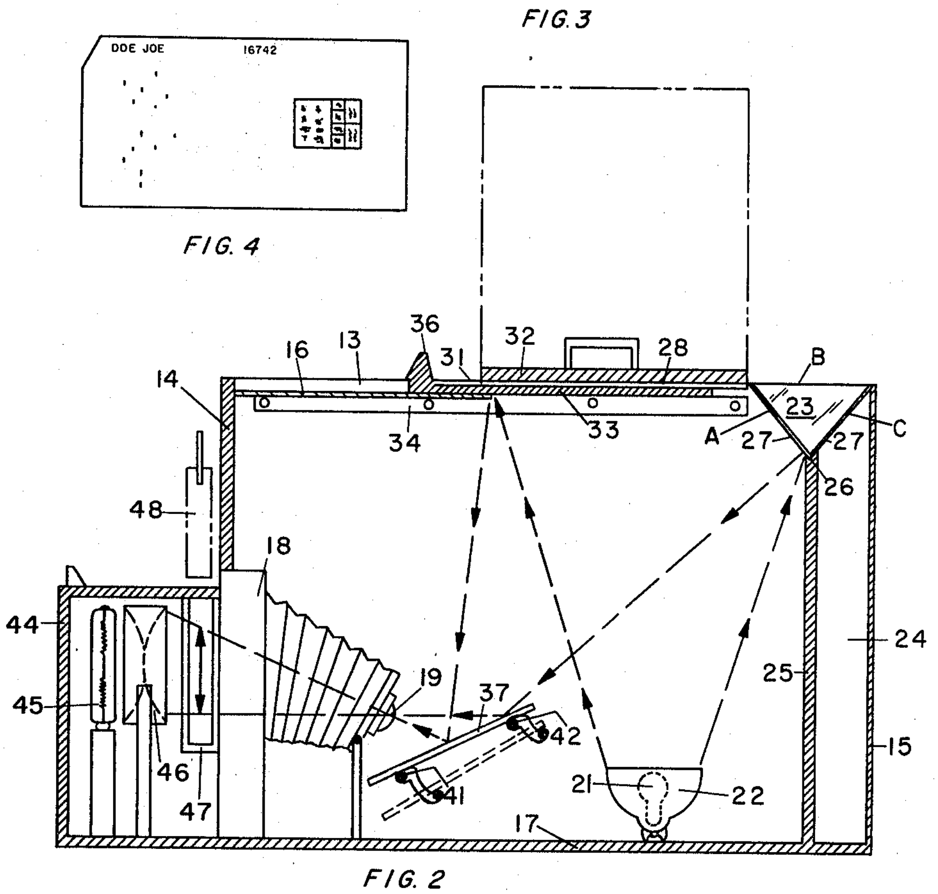
FIGURE 2 is a side elevation view in vertical section of the recording device taken along lines 2—2 of FIGURE 1, and additionally includes further apparatus indicated generally as 44 depicting a further improvement.
FIGURE 4 is an apertured film card disclosing one manner in which the film obtained from the present invention might be utilized.

Referring to the drawings, a photographic system for recording one or more fingers or skin areas is shown in FIGURES 1 through 3 wherein there is disclosed a box-like shape housing 11 having sides 12, 13, ends 14, 15, a top 16, and base 17. A camera 18 is mounted by suitable means at housing end 14, the camera having a lens 19, and a conventional push button or lever operated controlled shutter mechanism (not shown). Toward the center of the housing at base 17 are a pair of lamps 21 located adjacent opposite sides of the housing, and each provided with a separate shield 22 for directing light rays from each lamp in a manner and direction to be hereinafter disclosed.

A prism 23 is mounted at top 16 near housing end wall 15, the prism having three non-parallel faces denoted as A, B and C, face B being substantially parallel with the surface of housing top 16. Encompassing face C of the prism from below is a narrow chamber 24 otherwise bounded by, end wall 15, adjacent areas of side walls 12, 13, and a panel 25 extending upwardly from base 17 abutting the lower edge of prism 23 where surfaces A and C meet. A small V-shaped groove 26 and two larger V-shaped grooves 27 compatible with the angular formation of the prism, are respectively provided lengthwise at the crest of the panel 25 and formed within each side wall 12, 13 of the housing for supporting prism 23 in the position illustrated in the drawings. The inner surfaces of the chamber 24 are arranged so they will exhibit or present a dark, light absorbing effect, preferably a flat black finish, to dissipate or absorb any light rays directed therein by way of face C. In light of the above, chamber 24 will hereinafter be referred to as a "light trap."

Alongside and parallel with surface B of the prism is a flat glass plate 28 acting as a support for a data card 29 placed thereon. Pivotally secured by conventional means at the upper edge of side wall 13 of the housing are: a translucent screen 31 adapted to overlay glass plate 28, and an opaque pressure pad 32 also overlying glass plate 28. Slidably mounted at the top of the housing, and positioned just above top 16 is a tray 33, adapted to travel in a generally parallel path to top 16 and below glass plate 28 by way of guide rails 34 secured at each side of the housing, for preventing any outside light from entering within housing 11 by way of the glass plate when tray 33 is urged by way of handle 36 into its furthermost position in the direct indicated by the arrow X, to abut prism 23. Aside from prism 23 and glass plate 28 the housing is designed to be light tight as indicated above. To prepent the reflection of ambient light rays within the housing itself it would be advantageous to have the interior of the housing coated with a black, light absorbing medium.

Intermediate housing end 14 and the black chamber is a mirror 37 which can be fixedly held in either one of two possible tilted positions E and F relative to base 17, by a guiding arrangement comprising two pairs of aligned guide slots 38, 39 formed in opposite side walls 12 and 13 of the housing. These guide slots are respectively engaged by opposite ends of shafts 41, 42 that extend across the width of the housing and are secured at their mid-sections to mirror 37. The ends of shafts 41, 42 are tied together by a bracket 43 for ease of handling in positioning the mirror, and, of course, suitable light shielding means would be provided for preventing light from entering the housing via guide slots 38, 39, such as large rubber grommets, etc.

In operation, with mirror 37 adjusted to position E, tray 33 closed, and an electrical circuit to lamps 21 closed, shields 22 will direct the light rays upwardly from the lamps to illuminate face A of the prism and at least that area of glass plate 28 covered by document 29. However, since tray 33 is closed, its bottom surface should virtually absorb all of the light rays directed thereto. The lens 19 of camera 18 is normally focused via mirror 37 (in position E), so that no noticeable distortion would arise from viewing an object (finger, palm or foot) placed in contact with face B of the prism. When no object is present at face B, the light rays from lamps 21 directed to face B via face A, will be totally internally reflected within the prism to be directed via face C into light trap 24 where the light rays will be absorbed for all practical purposes. Under such conditions, virtually no light rays will be reflected back to appear at camera lens 19, therefore should the lens shutter be open a light sensitive member in the camera will not be exposed.

The recording of a finger or similar type print on film will occur when the finger is applied with a gentle press upon face B of the prism. At the areas of finger ridge contact with face B light rays will illuminate the areas of ridge contact and a portion of the light rays will be reflected back via face A, mirror 37, and lens 19 to provide sufficient light to expose selected areas on the film enclosed in the camera to produce an image of the finger print. Since the remaining area of the film will not be exposed, then by maintaining the lens shutter in an open condition for long time intervals (which could amount to one second, several seconds, 30 seconds or more), a single fingerprint at a time could be exposed to the film without disturbing other recordings on the film and the finger with a gentle application of pressure could even be rolled over face B to produce a rolled image on the film. The light sensitive member within the camera could comprise negative film, positive film, some positive-negative film combination such as that designated by the Polaroid Corp. as PN45 or any other member which would prove to be suitable for the present invention.

Figure 5:
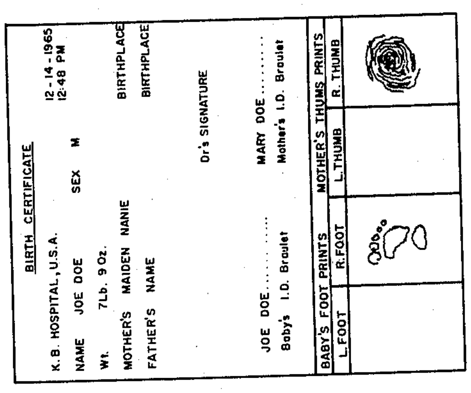
FIGURE 5 is an example of an exposed film frame obtained from employing apparatus of the present invention.

Provisions have been also made, should it be expedient, to record identity data on the same film along with the fingerprint recording. Accomplishment of the latter would be achieved by first positioning a data bearing identity document 29 on glass plate 28 along side prism 23, as illustrated in FIGURE 1, then opaque pressure pad 32 would be rotated to firmly press document 29 on the plate and simultaneously cover over all the remaining (exposed) areas of glass plate 28. Next by grasping handle 36 and displacing tray 33 in the direction opposite to the arrow X, the data on document 29 would be illuminated by lamps 21 and exposed to the camera lens 19 allowing the same to be additionally recorded on an area of the film adjacent to the recorded fingerprints. Of course, the procedural steps could be the inverse where the data might be recorded prior to the fingerprints, however, this is merely a matter of choice. An example of a complete exposed film frame which could be used in a hospital for identification of infants is depicted in FIGURE 5.

It may prove advantageous but not necessary in the present invention, to coat face A of prism 23 with an anti-reflection coating such as a dichroic coating so that a minimum percentage of the incident light rays directed toward face A will be reflected therefrom. Furthermore, it might be desirable to mount polarizing filters over the lens and/or lamps to subdue undesirable glare and reflections. By such practices, undesirable film exposure via lens 19 could be reduced to a less than negligible amount. To properly designate an approximate area on face B of the prism for recording a particular print such as the left or right thumb, face B is engraved with fixed identity nomenclature and lines as shown at 43 in FIGURE 3, which engravings into the surface will frustrate any total internal reflection at face B within the prism to reflect light rays back through face A toward the camera lens to appear as white data and expose the light-sensitive medium used, accordingly.

A significant but not critical requirement of the present invention, would be that of evenly illuminating the face B of prism 23 or at least that designated area from which recordings are to be made, thus applicant has depicted a pair of spaced lamps 21 slightly angled by way of shields 22 to help provide such an even illumination, however it is understood that many other types of illumination might be utilized such as an elongated circular lamp and shield combination that could be placed parallel to face A.

One modification of the invention might call for a black, light absorbing coating over face C of prism 23 to substitute as a light trap for the more spacious black chamber even though the latter is believed to be more efficient in absorbing light rays. It should also be additionally emphasized that camera 18 should be conceived of as virtually any type of a device used to record information on a light sensitive medium. For example, it might be advantageous to make a microfilm recording, so that microfilm could be mounted on a apertured tab card, such as that illustrated in FIGURE 4, allowing the original recording to be readily utilized for data storage purposes. A further advantage of employing a small film size would be the ability to adapt the processed film for use in a small wallet size identification card, or with embossable material such as poly vinyl chloride for combined use as a printing plate and identification device. For example, the process film could be combined therewith by either laminating the same with embossable PVC material or inserting the processed film into an embossable pocket and sealing up the open end of the pocket.

A further improvement to the present invention is described in FIGURES 1 and 2, wherein integral with housing end 14 there is shown in FIGURE 2 a compartment 44 secured to housing 11. Within the compartment is mounted a projector lamp 45, a condenser lens 46 and a container attachment 47 to camera 18 adapted to receive and discharge a film holder 48. In such an arrangement the camera would be of the type adapted to receive a film holder having a film packet and the container or film holder itself, would be adapted, when desired, to open compartment 44 containing projection lamp 45 to a developed transparency seated in the film holder.

In operation, by presenting a developed film transparency in film holder 48 to projection lamp 45, the film image can be directed through lens 19 and reflected off mirror 37 to be projected on translucent screen 31 positioned to overlay glass plate 28, thus allowing a view or display of the recorded information as a monitor or check for ensuring that the recording process had worked satisfactorily. Since prism 23 will not be suitable for such displaying purposes, the fingerprint portion of the film would not normally be seen, however, by adjusting mirror 37 from its E to F position, to displace to the left the light rays emitted from lens 19, a full display of the developed film transparency could be viewed on translucent screen 31. Such a procedure would be useful to determine the accuracy and legibility of the recorded information as compared to specified requirements.

A further advantage of this added improvement, is the provision for the reproduction of copies of the developed film transparency, which would be accomplished by merely placing a sheet of photo sensitive paper over glass plate 28 and then cover the same with opaque pressure pad 32. The projector lamp, when activated by closing a conventional switch connected from an A.C. outlet to the lamp, would project the data from the transparency onto the photo sensitive paper to produce thereon an image of the same for copying purposes.

Figure 6:
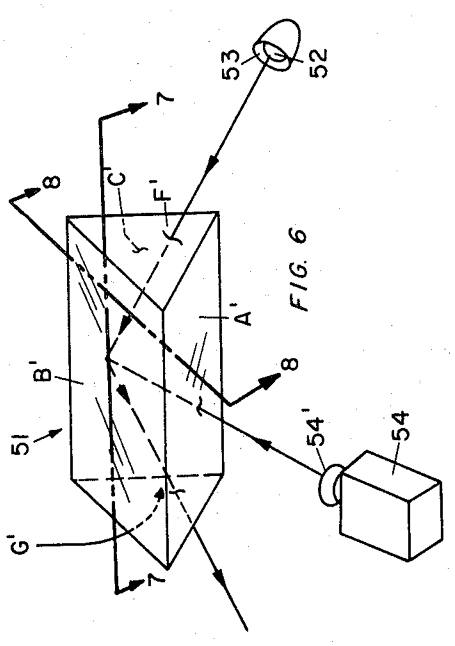
FIGURE 6 is a diagrammatic view of another embodiment of the present invention.
Figure 7:
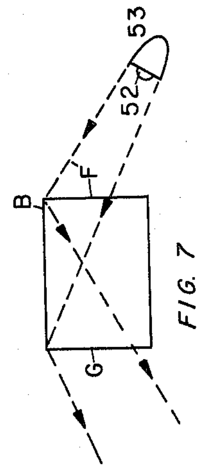
FIGURE 7 is a front elevation view in vertical section of the prism 51 taken along lines 7—7 in FIGURE 6.
Figure 8:
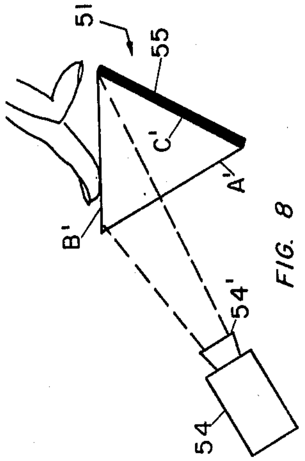
FIGURE 8 is a side elevation view in vertical section of the prism taken along line 8—8 in FIGURE 6.

A further embodiment of the present invention is schematically illustrated in FIGURES 6 through 8, wherein a prism 51, having faces $A^1$, $B^1$, $C^1$ and ends $F^1$ and $G^1$, is employed as in embodiments heretofore disclosed, however, in the present case a light source 52 is positioned opposite end $F^1$ to direct incident light rays by way of light guide 53 through the end $F^1$ on to prism face $B^1$, the light rays to normally be totally internally reflected thereat and directed out of the prism by way of end $G^1$ as shown in FIGURES 6 and 7. A camera 54, shown in FIGURES 6 and 8, is placed opposite prism face $A^1$, and although not disclosed the space between lens $54^1$ of camera 54 and face $A^1$ should be enclosed in some manner such as is provided for in FIGURE 1. A black, light absorbing coating 55 is shown over face $C^1$ in FIGURE 8, for the purpose heretofore explained, so that lens $54^1$ which is focused through prism face $A^1$ at an area on face $B^1$, will normally see black.

In operation when a finger is lightly pressed upon prism face $B^1$, at the areas of contact by the ridges of the finger, light rays from light source 52 illuminated the ridges and a portion of the incident light rays will be deflected from face $B^1$ toward lens $54^1$ through face $A^1$ to expose selected areas on a film within the camera to produce an image of the fingerprint in a similar manner as described relative to FIGURES 1 through 3.

It should be understood, of course, that the foregoing disclosure relates to only preferred embodiments of the invention and that numerous modifications or alterations may be made therein without departing from the spirit and scope of the invention; it is desired therefore, that only such limitations be placed on the invention as are imposed by the prior art and as set forth in the appended claims.

What is claimed:

1. Recording apparatus for photographing one or more fingers or skin areas comprising (a) a housing (b) a transparent body at least bounded in part by first, second and third plane faces, (c) dark, light absorbing means provided at the third face of said prism, (d) a camera having a lens focused, within the housing, through the second face of the transparent body on an area at the first face, said camera lens further being adapted to view said third face by way of said first face, (e) a light source adapted to direct light rays through the transparent medium to said first face which light rays are normally totally internally reflected within said transparent medium in a path so as not to enter the camera lens, (f) said apparatus adapted for photographing a skin area contacting said first face.

2. Apparatus according to claim 1
(a) wherein said transparent body is a prism.

3. Apparatus according to claim 2
(a) wherein said light source is positioned to direct the light rays through the second face to said first face to normally be reflected and absorbed by said dark, light absorbing background at the third face.

4. Apparatus according to claim 3
(a) including anti-reflection means placed intermediate the light source and the second face for preventing light rays from the light source from being reflected back to the camera by the second face surface.

5. Recording apparatus for photographing one or more fingers or skin areas comprising
a housing
a transparent body at least bounded in part by first, second and third plane faces,
dark, light absorbing means provided at the third face of said prism,
a camera having a lens focused, within the housing, through the second face of the transparent body on an area at the first face, said camera lens further being adapted to view said third face by way of said first face,
a light source adapted to direct light rays through the transparent medium to said first face which light rays are normally totally internally reflected within said transparent medium in a path so as not to enter the camera lens,
said apparatus adapted for photographing a skin area contacting said first face,
wherein said transparent body is a prism,
wherein said light source is positioned to direct the light rays through the second face to said first face to normally be reflected and absorbed by said dark, light absorbing background at the third face, and
polarizer means placed intermediate the light source and the second face for preventing reflected light from the second face to be directed to the camera lens.

6. Apparatus according to claim 1
(a) wherein said light absorbing means comprises a dark chamber having a light absorbing interior.

7. Recording apparatus for photographing one or more fingers or skin areas comprising
a housing
a transparent body at least bounded in part by first, second and third plane faces,
dark, light absorbing means provided at the third face of said prism,
a camera having a lens focused, within the housing, through the second face of the transparent body on an area at the first face, said camera lens further being adapted to view said third face by way of said first face,
a light source adapted to direct light rays through the transparent medium to said first face which light rays are normally totally internally reflected within said transparent medium in a path so as not to enter the camera lens,
said apparatus adapted for photographing a skin area contacting said first face
wherein said transparent body has a pair of opposing end faces, each end face being connected to an edge of each of the first, second and third faces, and
said light source is positioned to direct the light rays to the first face through one of the end faces and virtually reflecting most all the light rays out the remaining end face due to total internal reflection at said first face.

8. Recording apparatus for photographing one or more fingers or skin areas comprising
(a) a housing
(b) a prism like device, seated on the housing, and having a first, second, and third face, (c) light source means positioned in the housing directing light rays through the prism toward the first face by way of the second face,
(d) dark, light absorbing background means appearing at the third face of said prism for absorbing virtually all of the light rays from the light source reflected thereto by way of said first face,
(e) a camera secured to the housing opposite the second face and having its lens focused through the prism at the first face, said camera lens further adapted to view said third face by way of said first face,
(f) said first face adapted to receive a skin area which only at the areas of contact therewith, will reflect a sufficient amount of light rays directed to the first face from the light source, back through the second face to the camera lens to produce an illuminated contact pattern of the skin area.

9. Apparatus according to claim 8
(a) wherein said dark, light absorbing background comprises a chamber having a light absorbing interior.

10. Apparatus according to claim 8, wherein
(a) the camera lens normally sees only the dark background when the first face surface is free from contact, due to total internal reflection.

11. Apparatus according to claim 8 including
(a) a transparent medium positioned adjacent said prism and adapted to receive a data bearing document thereon,
(b) the light source means further provided to direct light rays toward said transparent medium, and
(c) said camera lens adapted to additionally see the area occupied by the transparent medium, and
(d) movable plate means mounted on said housing substantially corresponding in size to the transparent medium area to prevent light from coming through the transparent medium to enter the camera lens.

12. Apparatus according to claim 11 including
(a) a second light source located in the housing,
(b) an exposed film having an image,
(c) means for energizing said second light source to project the film image toward the area corresponding to the transparent medium,
(d) said transparent medium and movable plate means adapted to receive a photo sensitive sheet therebetween to expose said photo sensitive sheet to the film image projected by way of the second light source.

13. Apparatus according to claim 11 including
(a) a second light source located in the housing,
(b) an exposed film having an image
(c) means for energizing said second light source to project the film image toward the area corresopnding to the transparent medium,
(d) and a translucent screen adapted to overlie the transparent medium for display said projected image.

14. Apparatus according to claim 8 including
(a) permanent data engraved on the first face of the prism adapted to reflect light rays from the light source back through the second face to the camera lens.

15. A method for photographing a single image of a rolled finger or skin area comprising the steps of
(a) providing a transparent body having at least first, second and third plane faces,
(b) focusing the lens of a camera through the second face of the transparent body on an area at the first face,
(c) establishing a dark, light absorbing background at the third face,
(d) providing a source for directing light rays through the transparent medium to said first face so as to normally totally reflect the light rays in a path not to intercept the camera lens, and
(e) rolling a skin area over said first face while maintaining the lens open to photographically record a rolled image of said rolled skin area.

References Cited

UNITED STATES PATENTS

| | | | |
|---|---|---|---|
| 2,195,699 | 4/1940 | Johnson | 88—24 |
| 2,579,961 | 12/1951 | Popma | 88—24 |
| 3,138,059 | 6/1964 | White | 88—24 |

| | | | |
|---|---|---|---|
| 3,174,414 | 3/1965 | Myer | 88—24 X |
| 3,282,152 | 11/1966 | Myer | 88—24 |

NORTON ANSHER, Primary Examiner

R. A. WINTERCORN, Assistant Examiner

U.S. Cl. X.R.

95—1; 355—18, 40